United States Patent
Rommel et al.

(10) Patent No.: US 9,692,590 B1
(45) Date of Patent: Jun. 27, 2017

(54) SERIAL DATA MULTIPLEXING

(71) Applicant: Raytheon Company, Waltham, MA (US)

(72) Inventors: Gary J. Rommel, Lewisville, TX (US); Johnathan W. Craig, Allen, TX (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/960,574

(22) Filed: Dec. 7, 2015

(51) Int. Cl.
*H04L 7/00* (2006.01)
*H04L 7/033* (2006.01)

(52) U.S. Cl.
CPC .................. *H04L 7/0334* (2013.01)

(58) Field of Classification Search
CPC . H04L 25/0262; H04L 49/30; G06F 13/4282; G06F 13/4286; G06F 13/4204; H03M 9/00; H03K 19/17744
USPC ....... 341/100, 101; 375/355; 326/41, 39, 37, 326/86
See application file for complete search history.

(56) References Cited

U.S. PATENT DOCUMENTS

| | | | | |
|---|---|---|---|---|
| 5,079,770 A | * | 1/1992 | Scott | H04L 5/22 370/536 |
| 9,148,192 B1 | * | 9/2015 | Wong | H04L 25/14 |
| 2003/0219004 A1 | | 11/2003 | Liu et al. | |
| 2008/0031167 A1 | | 2/2008 | Chen | |
| 2011/0022753 A1 | | 1/2011 | Ingels | |

OTHER PUBLICATIONS

PCT International Search Report and Written Opinion dated Nov. 7, 2016 corresponding to International Application No. PCT/US2016/042007; 10 Pages.

* cited by examiner

*Primary Examiner* — Rahel Guarino
(74) *Attorney, Agent, or Firm* — Daly, Crowley, Mofford & Durkee, LLP

(57) ABSTRACT

In one aspect, a method includes receiving n data bits in parallel, receiving a data command signal, receiving a clock signal, transmitting the n bits in serial and encoding one of the n bits, after receiving the data command signal, to include at least three logical states. The number of states is a function of the clock signal.

20 Claims, 8 Drawing Sheets

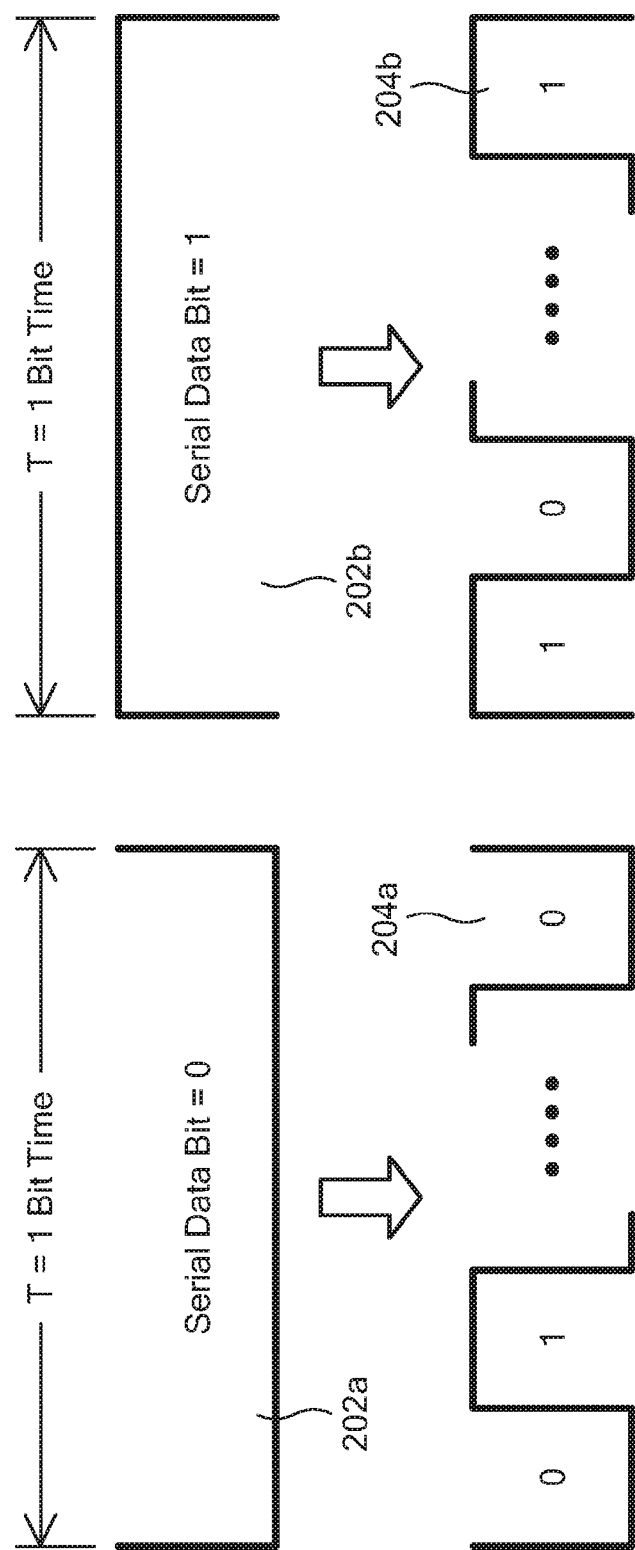

SERIAL DATA MULTIPLEXING

BACKGROUND

Standard asynchronous serial data interface (UART) includes a transmitter that serializes data bits and transmits at a baud rate and a receiver that over-samples serial data stream and extracts the data bits, then converts the data back to parallel bytes. Typically, serial data includes a start bit, n-bits of data and a stop bit.

SUMMARY

In one aspect, a method includes receiving n data bits in parallel, receiving a data command signal, receiving a clock signal, transmitting the n bits in serial and encoding one of the n bits, after receiving the data command signal, to include at least three logical states. The number of states is a function of the clock signal.

In another aspect, a system includes a transmitter that includes a first processor and a first non-transitory computer-readable medium that stores first computer-executable instructions. The first computer-executable instructions cause the first processor to receive n data bits in parallel, receive a data command signal, receive a first clock signal, transmit the n bits in serial; and encode one of the n bits, after receiving the data command signal, to include at least three logical states. The system also includes a receiver that includes a second processor and a second non-transitory computer-readable medium that stores second computer-executable instructions. The second computer-executable instructions cause the processor to receive a second clock signal, receive the n bits in serial in serial, output the n bits in parallel using the second clock signal, receive the encoded n bit and output a data signal in response to the encoded n bit. The number of states is a function of the clock signal.

In a further aspect, a system includes a transmitter that includes first electronic hardware circuitry configured to receive n data bits in parallel, receive a data command signal, receive a first clock signal, transmit the n bits in serial and encode one of the n bits, after receiving the data command signal, to include at least three logical states. The system also includes a receiver that includes second electronic hardware circuitry configured to receive a second clock signal, receive the n bits in serial in serial, output the n bits in parallel using the second clock signal, receive the encoded n bit and output a data signal in response to the encoded n bit. The number of states is a function of the clock signal.

BRIEF DESCRIPTION OF THE DRAWINGS

FIG. 2A is a diagram of an example of a serial data bit equal to "0" and multiplex data over the same time period.

FIG. 2B is a diagram of an example of a serial data bit equal to "1" and multiplex data over the same time period.

DETAILED DESCRIPTION

Described herein are techniques to use a serial data bus to multiplex data. For example, high speed data is sent on top of a low speed data. The techniques herein allow for an existing serial data bus to be used without changes to existing hardware (e.g., redesigning and re-layout of circuit cards) and without altering normal data traffic on the existing serial bus.

In one particular example, the techniques use a higher frequency (e.g., higher than the serial data) encoding algorithm to multiplex two separate data channels together at a transmitter onto a single serial communication path. A higher frequency decoding algorithm is also used at receiver to separate multiplexed communication path back into two separate data channels.

Figure 1:
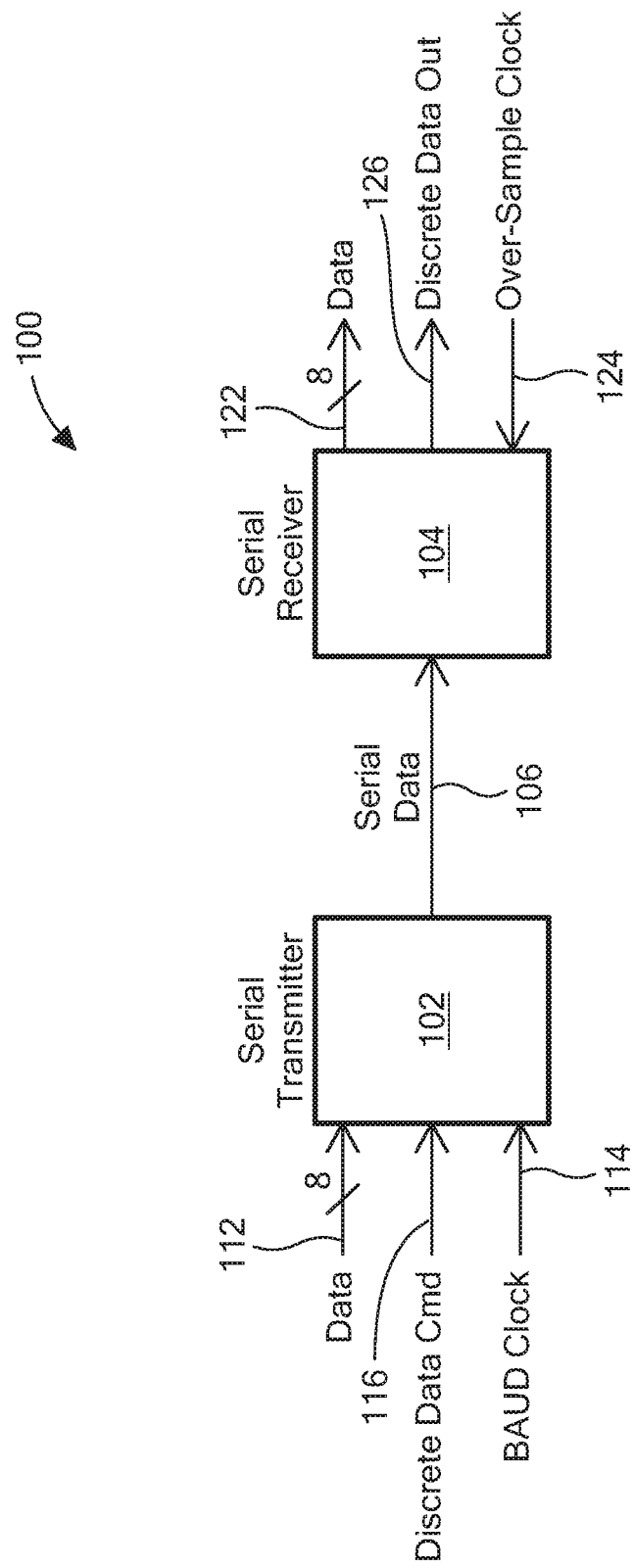
FIG. 1 is a diagram of an example of a system using a serial data bus to multiplex.

Referring to FIG. 1, a system 100 includes a serial transmitter 102 and a serial receiver 104. The serial transmitter 102 transmits serial data 106 to the serial receiver 104. The serial transmitter 102 receives data input 112 (e.g., 8 bits of data in parallel) and a baud clock signal input 114. The serial transmitter 102 also receives a discrete data command input 116. The discrete data command input 116 enables the serial transmitter 102 to encode a high frequency bit pattern onto the serial data 106. In some examples, the discrete data command may be sourced from any system interface such as, for example, an Ethernet, Discrete, USB and so forth.

The serial receiver 104 receives an over-sample clock signal input 124 and also receives and outputs the data output 122 (e.g., 8 bits of data in parallel). The serial receiver 104 also outputs discrete data output 126.

FIG. 2A depicts a diagram of an example of a serial data bit 202a (from serial data 106) equal to a logical "0" over a bit period and the high frequency encoding 204a over the same bit time period. The high frequency encoding 204a starts and ends with a logical "0" and alternates between logical "0" and "1" at equal intervals.

FIG. 2B depicts a diagram of an example of a serial data bit equal 202b (from serial data 106) to logical "1" over a bit period and the high frequency encoding 204b over the same bit time period. The high frequency encoding 204b starts and ends with a logical "1" and alternates between logical "0" and "1" at equal intervals.

Analysis has shown that for robustness the number of alternating states should be as large as possible, be odd, and contain a minimum of three sample clock periods per alternating state. For example, the relationship between Over-Sample Clock, Original BAUD Rate and number of alternating logical states is expressed as:

Number of Logical States=MAXIMUM ODD(Over-Sample Clock/(3×Original BAUD Rate), where MAXIMUM ODD function is used to determine largest odd number of states. In one particular example, the over-sample clock rate and the baud are selected so that the number of logical states is three or greater.

Figure 3B:
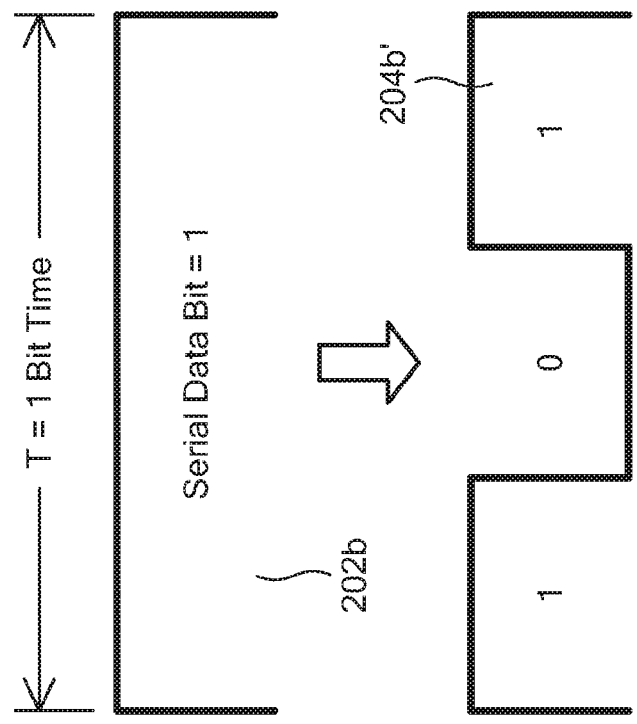
FIG. 3B is a diagram of one particular example of serial data bit equal to "1" and multiplex data over the same time period.
Figure 3A:
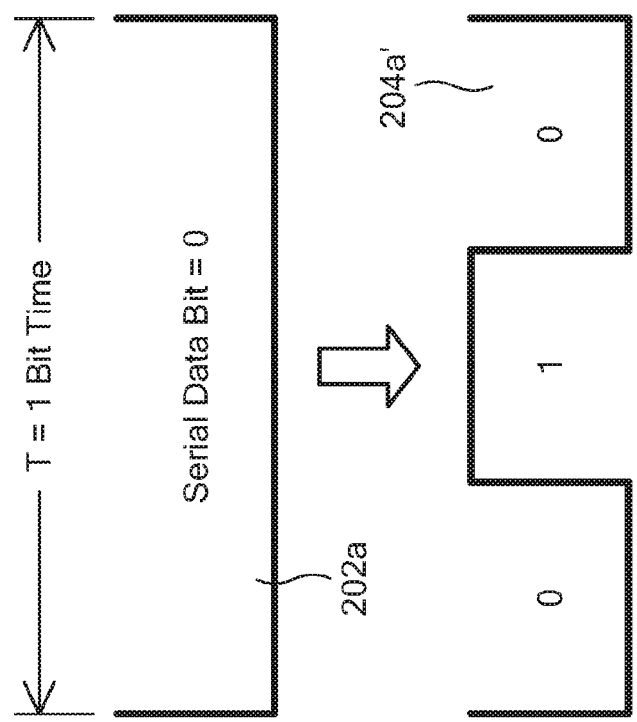
FIG. 3A is a diagram of one particular example of a serial data bit equal to "0" and multiplex data over the same time period.

In one particular example, if the over-sample clock rate is 50 MHz and the original baud rate is 5 Mbps then the number of logical states is equal to 3. For this particular example, FIG. 3A depicts the high frequency encoding 204*a*' over the same time period of the serial data bit 202*a* with three logical states (010) and FIG. 3B depicts the high frequency encoding 204*b*' over the same time period of the serial data bit 202*b* with three logical states (101).

Figure 3D:
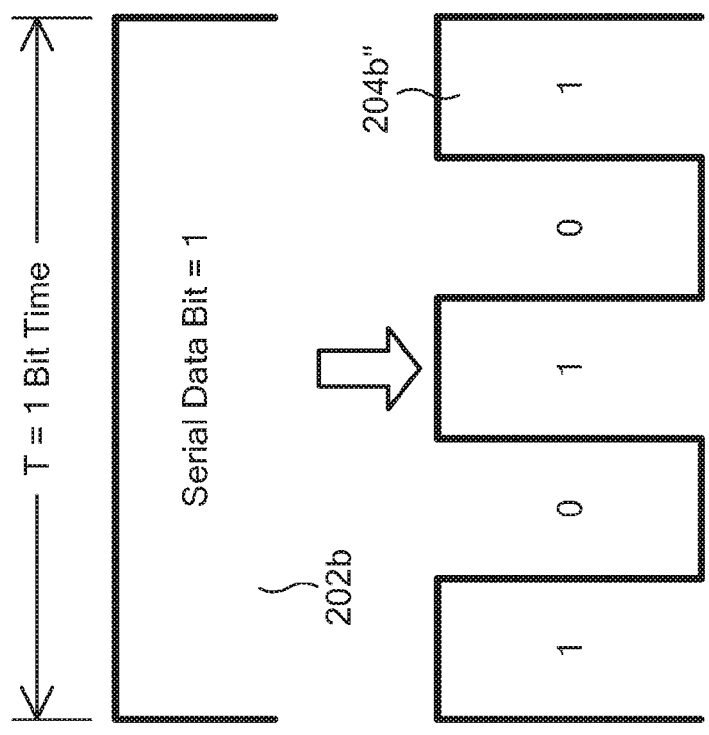
FIG. 3D is a diagram of another particular example of serial data bit equal to "1" and multiplex data over the same time period.
Figure 3C:
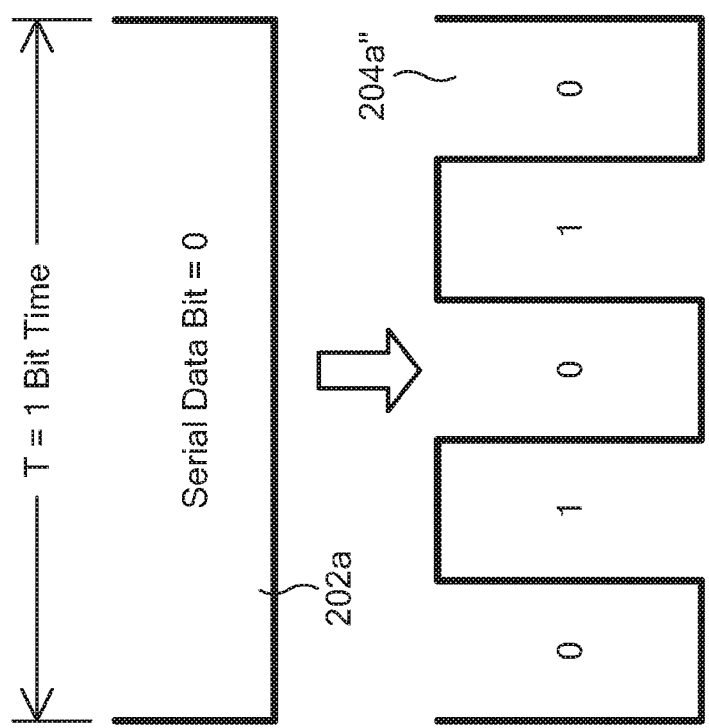
FIG. 3C is a diagram of another particular example of a serial data bit equal to "0" and multiplex data over the same time period.

Referring to FIGS. 3C and 3D, if you had a 5 Mbps system with 80 MHz Over-Sample Clock, this yields 80/(3*5)=5.33. Therefore the number of states is equal to 5. For this particular example, FIG. 3C depicts the high frequency encoding 204*a*'' over the same time period of the serial data bit 202*a* with five logical states (01010) and FIG. 3D depicts the high frequency encoding 204*b*'' over the same time period of the serial data bit 202*b* with five logical states (10101).

Figure 3E:
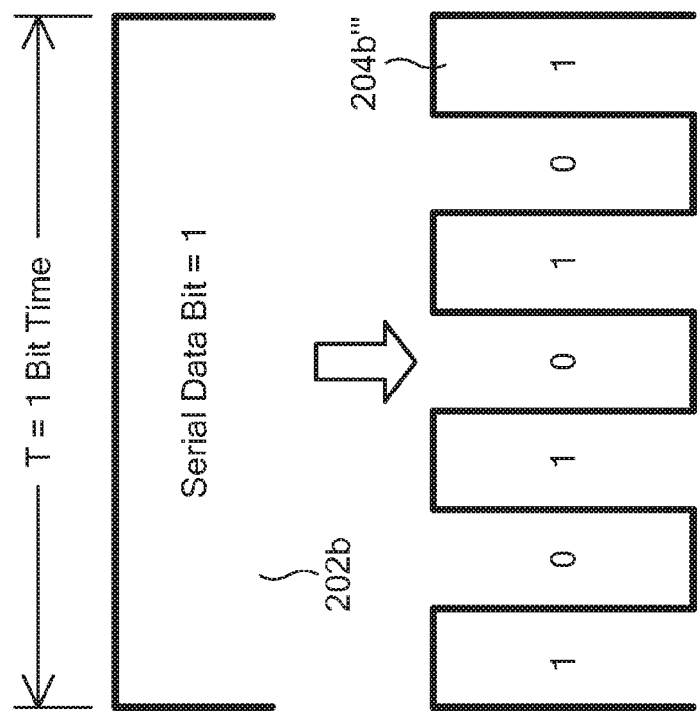
FIG. 3E is a diagram of a further particular example of a serial data bit equal to "0" and multiplex data over the same time period.
Figure 3F:
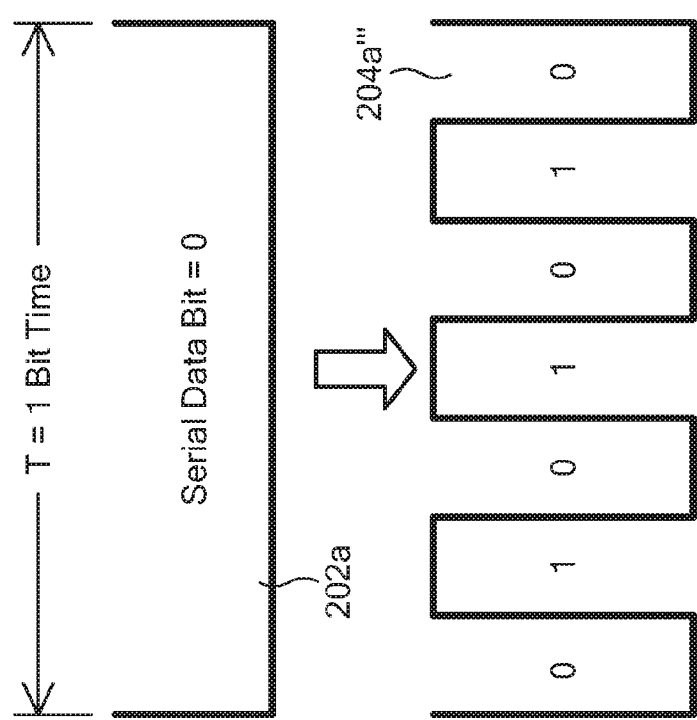
FIG. 3F is a diagram of a further particular example of serial data bit equal to "1" and multiplex data over the same time period.

Referring to FIGS. 3E and 3F, if you had a 5 Mbps system with 125 MHz Over-Sample Clock, this yields 125/(3*5)=8.33. Therefore the number of states is equal to 7. For this particular example, FIG. 3E depicts the high frequency encoding 204*a*''' over the same time period of the serial data bit 202*a* with seven logical states (0101010) and FIG. 3F depicts the high frequency encoding 204*b*''' over the same time period of the serial data bit 202*b* with seven logical states (1010101).

Figure 4:
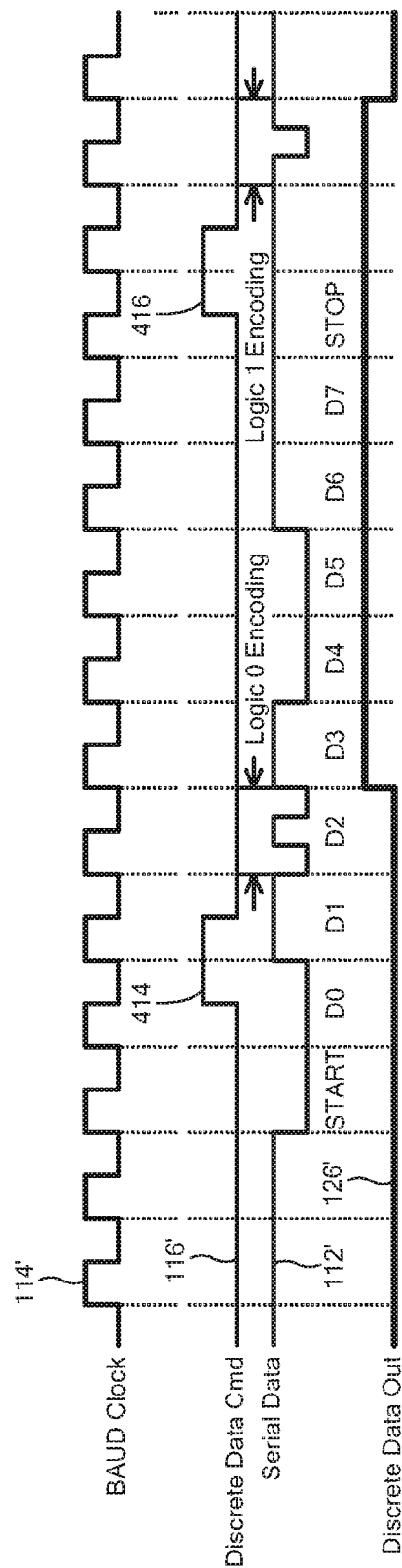
FIG. 4 is a timing diagram of a baud clock, data, a discrete data command, serial data and discrete data out.

FIG. 4 depicts a timing diagram for a baud clock 114', serial data signal 106', a discrete data command signal 116', and discrete data out 126' for the example of using three logical states within a bit period of a bit in the serial data 106. The serial data 106' includes a start bit (START), a stop bit (STOP) and eight bits of data (D0, D1, D2, D3, D4, D5, D6, D7, D8) between the start and stop bits. In this particular example, the start bit is a logical "0"; D0, D2, D4, D5 are each a logical "0", D1, D3, D6, D7 are each a logical "1", and the stop bit is a logical "1". The discrete data signal 116' includes a first command bit 414 (e.g., a transition from a logical "0" to a logical "1" and back to a logical "0"), which indicates encoded data is coming in the next cycle. That is, in the D2 bit includes a logical "0" 424 has been encoded. In response the discrete data out 126' transitions from a logical "0" to a logical "1". The discrete data signal 116' also includes a second command bit 416 (e.g., a transition from a logical "0" to a logical "1" and back to a logical "0"), which also indicates encoded data is coming in the next cycle. That is, the serial data signal 106' includes a logical "1" 426 that has been encoded. In response the discrete data out 126' transitions from a logical "1" to a logical "0." In one example, the encoded data in the serial data stream 106' sets and unsets a flag. For example, when the discrete data out 126' is a logical "1" the flag is set and when the discrete data out 126' is a logical "0" the flag is unset.

Figure 5B:
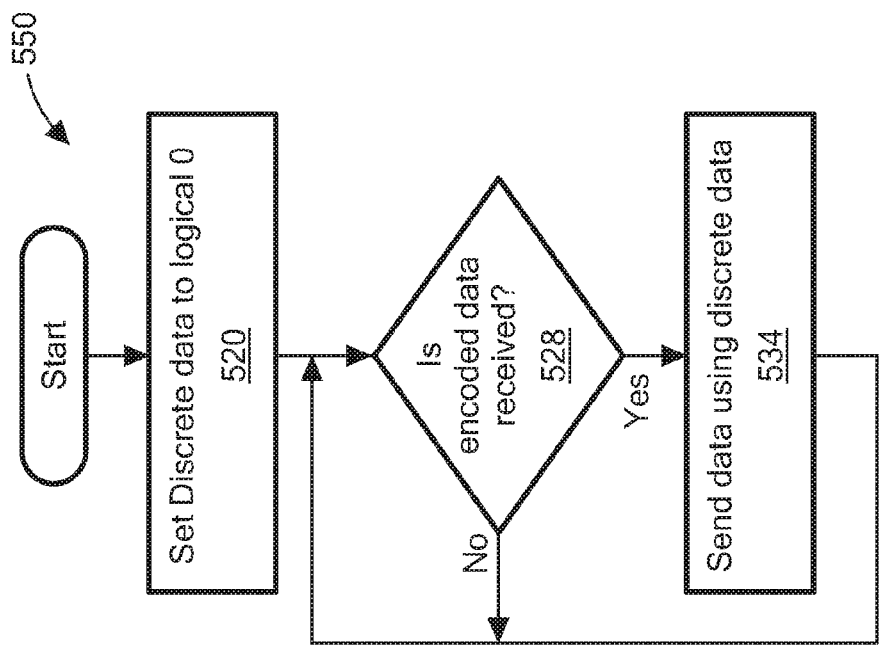
FIG. 5B is a flowchart of an example of a process to receive encoded data at the serial receiver.
Figure 5A:
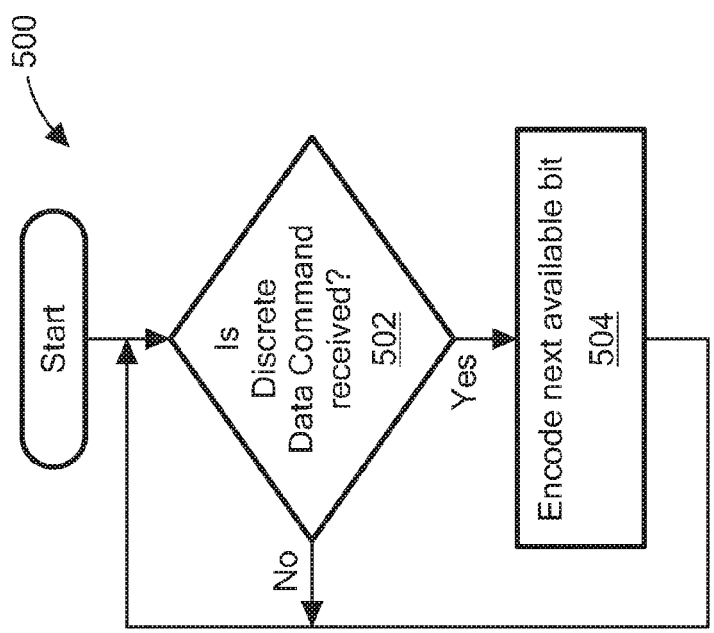
FIG. 5A is a flowchart of an example of a process to encode data at the serial transmitter.

Referring to FIG. 5A, a process 500 is an example of a process to encode data at the transmitter 102. Process 500 determines if a discrete data command is received (502). For example, in FIG. 4 the discrete data command 414 is received. If the discrete data command is received, process 500 encodes the next available bit (504). For example, in FIG. 4, after the data command 414 is received, the bit D2 with a logical "0" is encoded with a pattern "010" 424 over the one bit period. In another example, after the data command 416 is received, the next available bit with a logical "1" is encoded with a bit pattern "101" 426 over the bit period.

Referring to FIG. 5B, a process 550 is an example of a process to receive encoded data at the receiver 104. Process 550 sets the discrete data to logical 0 (520). Process 550 determines whether encoded data has been received (528). For example, process 550 receives a "010" 424 over a bit period as shown in FIG. 4. Process 550 sends the decoded data using the discrete data output 126 (534). In one particular example, as shown on FIG. 4, the encoded data is a flag and therefore the discrete data out 126' toggles from logical "0" to logical "1" after receiving the "010" pattern or the discrete data out 126' toggles from logical "1" to logical "0" after receiving the "101" pattern.

Figure 6:
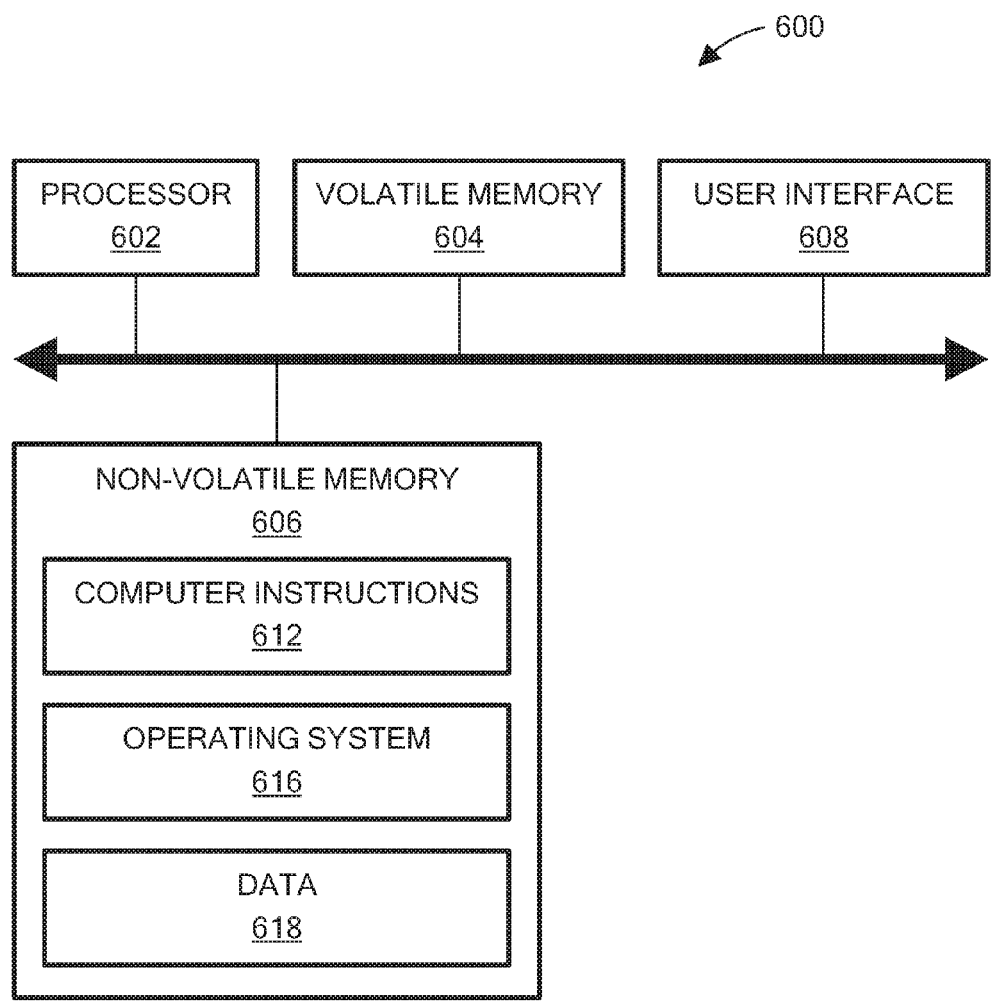
FIG. 6 is a computer on which any portion of the processes of FIGS. 5A and 5B may be implemented.

Referring to FIG. 6, in one example, a computer 600 includes a processor 602, a volatile memory 604, a non-volatile memory 606 (e.g., hard disk) and the user interface (UI) 608 (e.g., a graphical user interface, a mouse, a keyboard, a display, touch screen and so forth). The non-volatile memory 606 stores computer instructions 612, an operating system 616 and data 618. In one example, the computer instructions 612 are executed by the processor 602 out of volatile memory 604 to perform all or part of the processes described herein (e.g., processes 500 and 550).

The processes described herein (e.g., processes 500 and 550) are not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 500 and 550 are not limited to the specific processing order of FIGS. 5A and 5B, respectively. Rather, any of the processing blocks of FIGS. 5A and 5B may be re-ordered, combined or removed, performed in parallel or in serial, as necessary, to achieve the results set forth above.

The processing blocks (for example, in the processes 500 and 550) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
   multiplexing at a first frequency at least two data channels onto a serial communication path with serial data transmitted at a second frequency to form a multiplexed communication path, the first frequency being higher than the second frequency, the multiplexing comprising:
      receiving n data bits in parallel;
      receiving a data command signal;
      receiving a clock signal;
      transmitting the n bits in serial; and
      encoding at least one of the n bits, after receiving the data command signal, to include at least three logical states in a bit period, and
   wherein a number of the at least three logical states is a function of the clock signal.

2. The method of claim 1, wherein receiving the clock signal comprises receiving a first clock signal, and further comprising:
      receiving a second clock signal;
      receiving the n bits in serial in serial;
      outputting the n bits in parallel using the second clock signal;
      receiving the encoded n bit; and
      outputting a data signal in response to the encoded n bit.

3. The method of claim 2, wherein receiving the first clock signal comprises receiving a baud clock signal, and
   wherein receiving the second clock signal comprises receiving an over-sample clock signal, and
   wherein the over-sample signal is at least nine times larger than the baud clock signal.

4. The method of claim 2, wherein encoding at least one of the n bits, after receiving the data command signal, to include at least three logical states comprises encoding the at least one of the n bits to include a first and last logical state having the same logical state.

5. The method of claim 2, wherein receiving the first clock signal comprises receiving a baud clock signal having a baud rate,
   wherein receiving the second clock signal comprises receiving an over-sample clock signal having an over-sample clock rate, and
   wherein the number of logical states is equal to a maximum odd value of the over-sample clock rate divided by three times the baud rate.

6. The method of claim 1, wherein the at least three logical states alternate between two values for the duration of the bit period at equal time intervals.

7. The method of claim 6, wherein the at least three logical states alternate between "0" and "1" or visa-versa for the duration of the bit period at equal time intervals.

8. A system comprising:
   a transmitter comprising a first processor and a first non-transitory computer-readable medium that stores first computer-executable instructions, the first computer-executable instructions causing the first processor to:
      multiplex at a first frequency at least two data channels onto a single serial communications path with serial data transmitted at a second frequency to form a multiplexed communication path, the first frequency being higher than the second frequency, the instructions causing the first processor to multiplex comprising instructions causing the first processor to:
         receive n data bits in parallel;
         receive a data command signal;
         receive a first clock signal;
         transmit the n bits in serial; and
         encode at least one of the n bits, after receiving the data command signal, to include at least three logical states in a bit period;
   a receiver comprising a second processor and a second non-transitory computer-readable medium that stores second computer-executable instructions, the second computer-executable instructions causing the second processor to:
      separate the at least two data channels from the multiplexed communication path, the instructions causing the second processor to separate comprising instructions causing the second processor to:
         receive a second clock signal;
         receive the n bits in serial in serial;
         output the n bits in parallel using the second clock signal;
         receive the encoded n bit; and
         output a data signal in response to the encoded n bit,
   wherein a number of at least three logical states is a function of the first clock signal.

9. The system of claim 8, wherein the first computer-executable instructions causing the first processor to receive the first clock signal comprises instructions causing the first processor to receive a baud clock signal, and
   wherein the second computer-executable instructions causing the second processor to receive the second clock signal comprises instructions causing the second processor to receive an over-sample clock signal, and wherein the over-sample signal is at least nine times larger than the baud clock signal.

10. The system of claim 8, wherein the first computer-executable instructions causing the first processor to encode at least one of the n bits, after receiving the data command signal, to include at least three logical states comprises instructions causing the first processor to encode the at least one of the n bits to include a first and last logical state having the same logical state.

11. The system of claim 8, wherein the first clock signal comprises a baud clock signal having a baud rate,
wherein the second clock signal comprises an over-sample clock signal having an oversample clock rate, and
wherein the number of logical states is equal to a maximum odd value of the over-sample clock rate divided by three times the baud rate.

12. The system of claim 8, wherein the at least three logical states alternate between two values for the duration of the bit period at equal time intervals.

13. The system of claim 12, wherein the at least three logical states alternate between "0" and "1" or visa-versa for the duration of the bit period at equal time intervals.

14. A system comprising:
a transmitter comprising first electronic hardware circuitry configured to:
multiplex at a first frequency at least two data channels onto a single serial communications path with serial data transmitted at a second frequency to form a multiplexed communication path, the first frequency being higher than the second frequency, the first electronic hardware circuitry configured to multiplex further comprising circuitry to:
receive n data bits in parallel;
receive a data command signal;
receive a first clock signal;
transmit the n bits in serial; and
encode at least one of the n bits, after receiving the data command signal, to include at least three logical states in a bit period;
a receiver comprising second electronic hardware circuitry configured to:
separate the at least two data channels from the multiplexed communication path, the second electronic hardware circuitry configured to separate further comprising circuitry to:
receive a second clock signal;
receive the n bits in serial in serial;
output the n bits in parallel using the second clock signal;
receive the encoded n bit; and
output a data signal in response to the encoded n bit,
wherein a number of the at least three logical states is a function of the first clock signal.

15. The system of claim 14, wherein the first circuitry of the transmitter comprises at least one of a processor, a memory, a programmable logic device or a logic gate.

16. The system of claim 14, wherein the second circuitry of the receiver comprises at least one of a processor, a memory, a programmable logic device or a logic gate.

17. The system of claim 14, wherein the first electronic hardware circuitry configured to receive the first clock signal comprises circuitry configured to receive a baud clock signal, and
wherein the second electronic hardware circuitry configured to receive the second clock signal comprises circuitry configured to receive an over-sample clock signal, and
wherein the over-sample signal is at least nine times larger than the baud clock signal.

18. The system of claim 14, wherein the first electronic hardware circuitry configured to encode at least one of the n bits, after receiving the data command signal, to include at least three logical states comprises circuitry configured to encode the at least one of the n bits to include a first and last logical state having the same logical state.

19. The system of claim 14, wherein the first clock signal comprises a baud clock signal having a baud rate,
wherein the second clock signal comprises an over-sample clock signal having an oversample clock rate, and
wherein the number of logical states is equal to a maximum odd value of the over-sample clock rate divided by three times the baud rate.

20. The system of claim 14, wherein the at least three logical states alternate between two values for the duration of the bit period at equal time intervals.

* * * * *